June 25, 1940.   M. J. SCHOENBERG ET AL   2,205,440
EDUCATIONAL GAME
Filed Sept. 20, 1938   2 Sheets-Sheet 1

| | 1 | 2 | 3 | 4 | 5 | 6 | 7 | 8 | 9 | 10 | 11 | 12 |
|---|---|---|---|---|---|---|---|---|---|---|---|---|
| | | | | REFEREE | | | | | | | | |
| 1 | 1 | 2 | 3 | 4 | 5 | 6 | 7 | 8 | 9 | 10 | 11 | 12 |
| 2 | | 4 | 6 | 8 | 10 | 12 | 14 | 16 | 18 | 20 | 22 | 24 |
| 3 | | | 9 | 12 | 15 | 18 | 21 | 24 | 27 | 30 | 33 | 36 |
| 4 | | | | 16 | 20 | 24 | 28 | 32 | 36 | 40 | 44 | 48 |
| 5 | | | | | 25 | 30 | 35 | 40 | 45 | 50 | 55 | 60 |
| 6 | | | | | | 36 | 42 | 48 | 54 | 60 | 66 | 72 |
| 7 | | | | | | | 49 | 56 | 63 | 70 | 77 | 84 |
| 8 | | | | | | | | 64 | 72 | 80 | 88 | 96 |
| 9 | | | | | | | | | 81 | 90 | 99 | 108 |
| 10 | | | | | | | | | | 100 | 110 | 120 |
| 11 | | | | | | | | | | | 121 | 132 |
| 12 | | | | | | | | | | | | 144 |
| | | | | | | | | | | | | |

INVENTOR.
Mark J. Schoenberg
Harry Maximon
BY Ostrolenk, Greene & Nassen
their ATTORNEY.

June 25, 1940.   M. J. SCHOENBERG ET AL   2,205,440
EDUCATIONAL GAME
Filed Sept. 20, 1938   2 Sheets-Sheet 2

INVENTOR.
Mark J. Schoenberg
Harry Maximon
BY
Ostrolenk, Greene & Marsen
their ATTORNEYS Patented June 25, 1940

2,205,440

UNITED STATES PATENT OFFICE 2,205,440

EDUCATIONAL GAME

Mark J. Schoenberg and Harry Maximon, New York, N. Y.

Application September 20, 1938, Serial No. 230,762

2 Claims. (Cl. 35—31)

The object of our invention is to provide a novel educational game whereby a knowledge of mathematics and a recognition of certain objects such as flowers, trees, birds, leaves, plants, insects, costumes, buildings, paintings, etc., may be imparted to children. More specifically, our invention relates to a novel game comprising means carrying indicia representing facts, data and answers to various problems or questions in the fields it is desired to teach, and cooperating means carrying matching values which are to be coordinated with the problem carrying means.

The desirability of imparting to children a knowledge of mathematics in such a manner as to render its assimilation pleasing to them has long been recognized. The various games and devices which have hitherto been presented have singularly lacked attractiveness in that they merely represented an easily discernible imitation of teaching methods and presented no features which would make pleasant the labor attached to the assimilation of mathematics and for that reason they have not been commonly accepted. Previously the games which attempted to convey mathematical knowledge have comprised simply a review of the problems presented in school with games depending upon merely answering or solving the problems in the conventional manner. The surprise element of concealing the answer was in such close line with the normally unattractive school teaching that children customarily refused to accept them in the guise of game.

We have devised a novel means and manner for so presenting the pleasurable aspects of mathematics that the study of this science assumes the true pleasure of a game and at the same time the very desirable advantages of imparting mathematical knowledge is achieved. To accomplish this, we have resorted not merely to a game which presents a problem and demands an answer, but our novel game comprises a series of cards on which are presented certain individual mathematical problems, there being a fixed number of such cards bearing problems. In conjunction with the use of these cards, we employ discs which carry arbitrary values, and these discs represent the unknown values in the game. The unknown values are the chance factors which are the pleasurable elements in games demanded by children and adults alike. The discs bearing the arbitrary values are placed with the values concealed and are periodically turned up and the values revealed by the individual players in turn.

Dividing the game of teaching mathematics into its simple natural divisions, we have, for example, a game involving addition, a game involving multiplication, a game involving subtraction, a game involving division, and a game involving a combination of two or more of these. The principles of our game may be extended, as will be more specifically pointed out hereinafter, to cover the various higher branches of mathematics such as algebra, geometry and calculus, thus appealing to the various ages and the various intelligences.

Taking, for example, the game involving multiplication, we have a deck comprising 78 cards, each card carrying a problem in multiplication, such as 2 times 3, 8 times 4, 1 times 2, etc. Preferably, the problems range from 1 times 1 to 12 times 12. Each player receives five cards which are placed face exposed in front of the player in full view of all the players. Assuming that there are five players, there are twenty-five cards bearing problems, exposed as indicated, five cards in front of each player. In the center of the table are placed a number of discs bearing arbitrary values which represent additive values of the solutions set forth on the various cards. These discs are placed face down with the values concealed. The first player turns up a disc revealing one of the arbitrary values, which, for example, may be 24. The player then scans all the twenty-five cards exposed on the table, mentally selecting an aggregate of solutions presented on such cards which will add to or amount to 24. Thus he can select a card bearing 2 times 3, one bearing 8 times 1, and one bearing 5 times 2, the sum of answers to which amounts to 24. It will be noted that the solutions of these problems are respectively 6, 8 and 10 which additively total 24. The first player then picks up these cards and the corresponding disc and places them at his side and the next player in turn turns up the concealed disc and proceeds in a like manner.

If when a player turns up one of the discs bearing an arbitrary value and cannot find, by scanning the exposed cards, a value or number of values which additively equal the value set forth on the disc, the disc remains exposed and the next player turns up another disc and may still, if he can, find a sequence of solutions to cards presented that equal the arbitrary value exposed by the preceding player. This is in reward for his superior discernment since he may still seek values to correspond to the disc he has himself turned up and thus secures additional cards and points. It is thus important to players that they do not fail to overlook possible equivalents to the arbitrary values that turn up since the succeeding player, if he finds a sequence of cards equal to the value presented, gains a distinct advantage over his opponents.

Inasmuch as the winner of the game is determined in part by the number of cards he seizes, it is to the players' advantage to arrive at the arbitrary value with the greatest number of cards. It is desirable, therefore, for him to selectively pick cards carrying problems so as to gain as many cards as possible with a single disc. We propose also to place on certain of the cards carrying the more complex problems involved, such as 12 times 9 and 9 times 7, indicia representing premiums so that the winner is determined in part by the number of cards he has in his possession at the end of the game and in part by the premium points on the cards he possesses. The indicia may alternately be located on the disc that carry the functions of the various cards.

As cards are taken from in front of the player to match the arbitrary values on the discs turned up by the players, they are replaced from the main pack which originally contains 78 cards so that all players have in front of them five cards every time a disc is turned to reveal an arbitrary value.

When all cards are exhausted, each player counts the cards he has accumulated and the winner is determined by the number of cards and premium designations upon the cards.

For settling disputes or questions with regard to the true solutions to the various problems presented and the true additive or multiple results thereof, we provide a referee card which contains upon it in regular order the true and accurate solutions to all problems presented on the cards and presented in matching the arbitrary values on the face thereof. This referee card is normally placed adjacent the players but concealed and used to verify the calculations arrived at by the players in their pursuit of the game.

It can thus be seen that the game of our invention does not constitute the conventional and undesirable method of merely presenting problems to be answered but, by combining the element of chance represented by the discs with the unknown arbitrary values thereon and by making these discs represent a solution or a composite of solutions, the game contains all pleasurable elements ordinarily associated by children and adults alike with true games. Inherently and inevitably, however the playing of the game and the mechanics of the game impress upon the players a recognition of the solutions presented by the problems on the cards and further impart as a result of repeated playing of the game a facility both in the solution of the problems presented and also a facility in the aggregation of the solutions to match the arbitrary values.

There is thus achieved the desirable result of a great facility in the mathematical branches involved without the hardships real or imaginary involved in conventional tedious drill.

It will readily be seen that the game we have specifically set forth with regard to problems in multiplication is equally applicable when the cards present problems in subtraction, addition or division. For more complex modifications, the arbitrary values set forth on the discs may represent multiples, divisors, square or cube roots, etc. of the solutions in lieu of additive values thereof.

Another modification of our invention involves applying the principles above set forth in the form of a game involving the recognition of flowers, birds, insects, fish, plants, trees, costumes, and other constituents of nature or man. In this game, we provide a number of cards bearing the pictorial representation of various flowers, some well known and some little known. In cooperation with these cards bearing the pictorial representation of various flowers, we employ discs bearing names of flowers. For each card bearing the representation of a flower there is a corresponding disc bearing the name of that flower. There may be various species of the various genuses as for example, there may be various roses included among the pictorial representation on the cards and on the discs we may have, in addition to the discs bearing the names of each specific flower, the generic name "rose," "lily," etc. Like the mathematical game previously set forth, the cards bearing the pictorial representation of the various flowers are distributed to the players and may be placed face up in front of the respective players. The discs carrying the identification of the particular flowers are placed face down in the center of the table and each player in turn reveals a disc setting forth a specific or generic name. If the player turns up a specific name, he scans the board to find the flower which the name identifies and as he does so he carries both the disc and the card bearing the pictorial representation of the flower to his side to form his winning pile. If a disc is turned up bearing a generic name, such as rose, he may take those cards revealed which are specific to the genus "rose." In the case of flowers which are customarily difficult to recognize and little known, certain premium values may be attached to the identification of such flowers by impressing on the cards bearing such pictorial representation of such difficultly identifiable flowers in the form of indicia representing a certain number of premium points.

Similar to the game involving mathematical problems hereinbefore set forth, if a player, upon turning up a name of a flower, fails to identify the card bearing the pictorial representation of the flower which corresponds to the name, the succeeding player may avail himself of this lapse and, if he can identify the flower, succeeds in obtaining both that card bearing the flower corresponding to the disc turned up by the former player, and the flower representing the name on the disc he himself turns up. As will be apparent, of course, from time to time, as the more difficult names are encountered, there will be a multiplicity of revealed discs which will be available for identification by the more skillful players.

The winner of the game is determined by the number of cards held by each player and by an addition of the premium points on the cards if he holds such. As will be apparent, the game we have set forth involves not a tedious drill in memorizing names of flowers, insects, birds, etc., but involves such elements of chance in connection with the identification of such objects as to provide pleasurable game features so that the corollary fact that repetitious playing of the game necessarily involves a thorough ability to identify such objects makes the learning of such identifications a pleasant game.

A variation of these identifications includes the placing upon the card which bears a pictorial representation of the article to be identified, the identifying name itself. This identifying name may be concealed by a detachable concealing means which may comprise a band or partition covering or any suitable means for effecting any temporary covering of such identification. Thus, when very young children or those almost totally inexperienced in the identifying of the picture involved, play the game they may, if the identification of the object becomes questionable, consult the concealed identifying names on the card. In addition, a more simple modification of the game comprises a simple matching of the cards by the players in the course of which one player displays a card bearing a certain species or genus of objects and the competing player or players must produce a corresponding genus or species of the same objects in order to be entitled to the card displayed by the first player.

In a game of that nature a card may bear the identification of the object represented thereon but the identification should be concealed at all times during the playing of the game.

Similarly, a referee card may be employed on which the identification of all the objects carried by the cards are set forth and also the respective species of each genus represented in the game. This referee card affords a check that may be employed by the players to verify their movements in the game.

It is an object, therefore, of our invention to provide a novel game comprising cards and discs, the cards carrying various problems and the discs carrying arbitrary values which have a summative relationship with the problems presented on the cards, being either a multiple or an additive factor thereof.

It is a further object of our invention to provide means having individual problems in mathematics presented on at least one face thereof and means carrying indicia representing arbitrary values correlated to the true solutions presented by the problems on such first mentioned means.

It is a further object of our invention to provide a novel game which comprises cards carrying problems having fixed answers and coordinating discs carrying indicia representing values which have mathematical relationship to one or more of the fixed answers.

It is a further object of our invention to provide a game involving the elements of chance and combination in cooperation with cards bearing problems to be solved.

It is a further object of our invention to provide a new game in which by competitive endeavor the players seek to accumulate as great a number as possible of cards carrying problems, the cards being gained by matching the answer presented in the problems on the cards with indicia carried by cooperating means.

Figure 1:
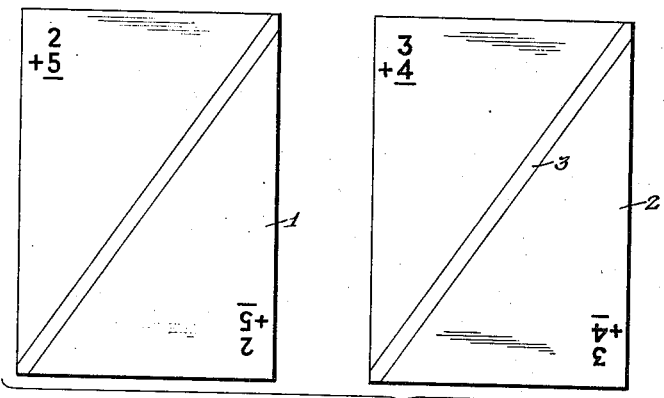
Figures 1 and 2 represent plan views of certain groupings of the cards and discs of our invention in their matched relation.

Referring now more specifically to the drawings in Figure 1 we have shown two cards and a disc. On the card 1 is a problem two plus five, and on the card 2 is a problem three plus four. Diagonally across the cards runs a line 3 which divides the cards into two sections. As has been pointed out hereinbefore the player solves the problems and secures as their results seven and seven which additively amounts to fourteen. If the player has turned up disc 4 with the number fourteen thereon, he then may select the two cards shown and secures those for his answer.

Figure 2:
Figure 2:
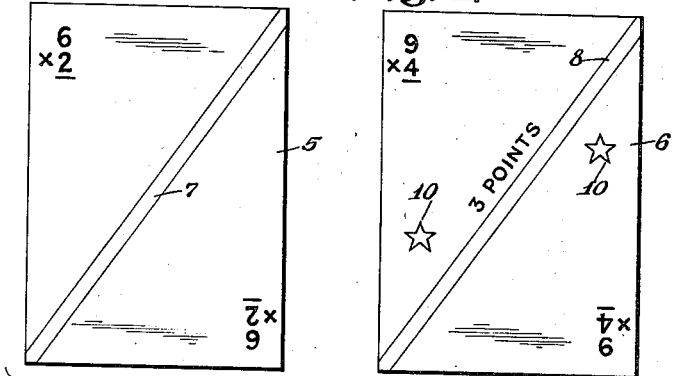

In Figure 2 there are shown similar cards 5 and 6 which carry certain problems in multiplication thereon. The cards are likewise divided across by diagonal lines 7 and 8 into two sections. On the card 6 which bears the problem nine times four, which, for purposes of illustration is regarded as one of the more difficult problems in multiplication, there is an added star 10 with the adjacent notation of three points. Thus the player who secures this card in the final summation of points to determine the winner of the game has an added three points. It will be noted that the solution of the problem presented on card 5 equals twelve and the solution of the problem presented on card 6 equals thirty-six, and therefore when the disc 12 is turned up by the player or is left by a preceding player, the player turning it up may aggregate the two cards 5 and 6 to match the number forty-eight thereon.

Figure 3:
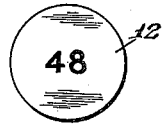
Figure 3 is a plan view of the referee card which is used in the game of our invention.

In Figure 3 we show a referee card which contains thereon the multiplication solutions presented by the respective cards. This referee card may be referred to the players for their solution of any difficulties or settlement of arguments that may arise. Although we have shown a referee card particularly adapted for the determination of multiplication problems, obviously the use of a referee card for the various other problematical solutions is contemplated.

Figure 4:
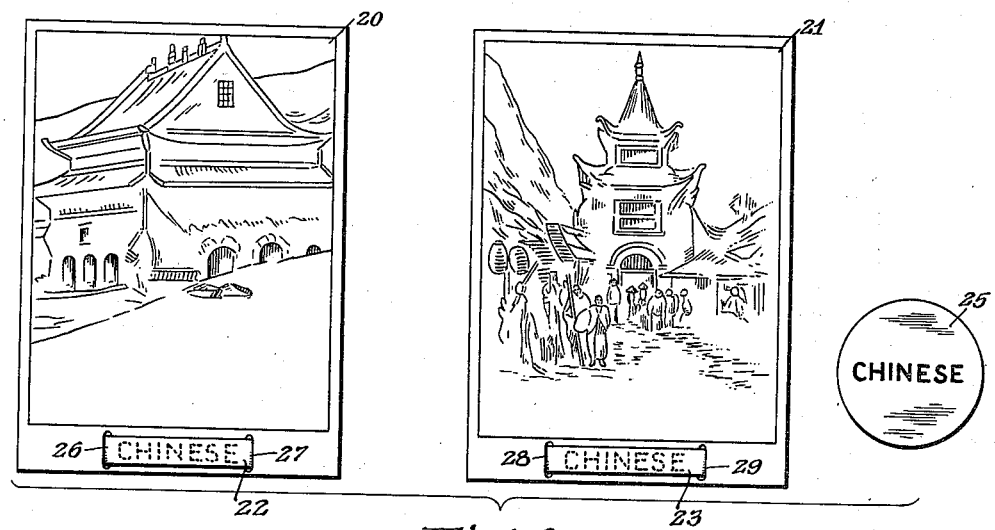
Figure 4 represents a plan view of two cards representing species of architecture and a matching disc of the game of our invention.

In Figure 4 we show two cards 20 and 21. On the card 20 is a representation of a particular type of Chinese architecture. On the card 21 is a pictorial illustration of a modified form of Chinese architecture. On the bottom of the cards are indicia "Chinese" which, however, are normally concealed beneath the strips 22 and 23 which are superimposed over the identifying indicia but are detachable therefrom. When the player turns up the disc 25 with the notation "Chinese" thereupon, he scans the board and selects therefrom cards which have the representation shown on cards 20 and 21. He must identify the pictures of these cards as representing Chinese architecture without referring to the concealed indicia which are only revealed in cases of dispute between the players. The concealing strips 22 and 23 are detachably engaged in the slots 26 and 27 from the card 20 and the slots 28 and 29 on the card 21.

Figure 5:
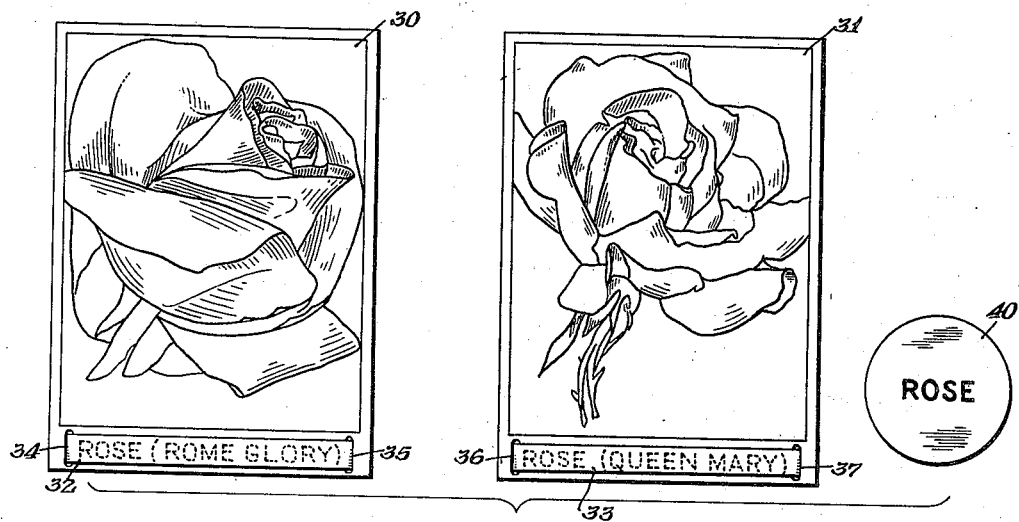
Figure 5 shows two cards representing species of flowers and a matching disc of our invention.

In Figure 5 we have shown pictorial representations of two different species of rose on cards 30 and 31 respectively. Identification of the particular species of rose is normally concealed by the strips 32 and 33 suitably detachably secured on the cards and over the identification by the slots 34, 35, 36 and 37. When the player turns up a disc 40 bearing thereon a generic term "Rose" he again scans the board and selects cards bearing the species of "Rose" such as are shown on the cards 30 and 31 and which match the generic term on the disc.

We claim:

1. A game comprising a plurality of elements bearing dissimilar mathematical problems, a plurality of solution members each bearing a value representing the answer to a mathematical problem based upon the answers to problems appearing on at least two of said elements.

2. A game comprising a plurality of elements bearing dissimilar mathematical problems, a plurality of solution members each bearing a value which represents the sum of the answers to problems appearing on at least two of said elements.

MARK J. SCHOENBERG.
HARRY MAXIMON.